(12) United States Patent
Hoogerbrugge et al.

(10) Patent No.: US 6,615,333 B1
(45) Date of Patent: Sep. 2, 2003

(54) DATA PROCESSING DEVICE, METHOD OF EXECUTING A PROGRAM AND METHOD OF COMPILING

(75) Inventors: Jan Hoogerbrugge, Eindhoven (NL); Alexander Augusteijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/563,369

(22) Filed: May 3, 2000

(30) Foreign Application Priority Data

May 6, 1999 (EP) .............................................. 99201425

(51) Int. Cl.$^7$ .............................................. G06F 12/00
(52) U.S. Cl. ..................... 711/169; 712/216; 712/226
(58) Field of Search ......................... 711/169; 712/214, 712/215, 216, 226

(56) References Cited

U.S. PATENT DOCUMENTS

| 5,606,670 A | * | 2/1997 | Abramson et al. | 711/154 |
| 5,615,350 A | * | 3/1997 | Hesson et al. | 712/216 |
| 5,751,946 A | * | 5/1998 | Afsar et al. | 714/50 |
| 5,758,051 A | * | 5/1998 | Moreno et al. | 714/2 |
| 5,841,998 A | * | 11/1998 | Isaman | 712/208 |
| 5,931,957 A | * | 8/1999 | Konigsburg et al. | 712/216 |
| 6,058,472 A | * | 5/2000 | Panwar et al. | 712/214 |

OTHER PUBLICATIONS

William Y. Chen et al; "Tolerating Data Access Latency with Register Preloading", Proceedings of the 1992 International Conferenc on Supercomputing.

* cited by examiner

*Primary Examiner*—Hiep T. Nguyen
(74) *Attorney, Agent, or Firm*—Daniel J. Pietrowski

(57) ABSTRACT

A data processing device has a circuit for correcting an effect of executing memory access instructions out of order with respect to one another in a pipeline. A detector detects whether a same memory location is addressed by a first and second memory address used to access memory for a first and second memory access instruction that are processing at a predetermined relative distance in the pipeline respectively. A correction circuit modifies data handling in a pipeline stage processing the first memory access instruction when the detector signals the addressing of the same memory location and the first and/or second memory access instruction programs a command to compensate said effect of out of order execution of the first memory access instruction with respect to said second memory access instruction.

12 Claims, 5 Drawing Sheets

DATA PROCESSING DEVICE, METHOD OF EXECUTING A PROGRAM AND METHOD OF COMPILING

BACKGROUND OF THE INVENTION

The invention relates to a data processing device that has a forward load instruction that can be taken into execution before a store instruction that stores the data loaded by the forward load instruction. The invention also relates to a method of executing programs using a forward load instruction and to a method of generating machine code programs containing forward load instructions.

Forward loading is known from an article titled "Tolerating Data Access Latency with Register Preloading", written by William Y. Chen, Scott A. Mahlke, Wen-mei W. Hwu, Tokuzo Kiyohara and Pohua P. Chang and published in the "Proceedings of the 1992 International Conference on Supercomputing.

To improve the efficiency of a computer program it is desirable that it is possible to change the sequence of execution of instructions in a program without changing the results of the program. The possible changes in sequence are limited by data dependencies between instructions, where a first instruction may affect the data used by a second instruction. In that case, the second instruction cannot normally be executed before the first instruction.

One particular type of dependency is "load-store" dependency, where a first instruction stores data to memory and a second instruction loads data from memory. When it is not known for certain that the second instruction loads from a different memory location than the first instruction, the sequence of executing the load instruction and the store instruction cannot normally be changed without affecting the results of the program.

This is a problem that is similar to the problems that occur in cache prefetching, which can be corrected by updating data in the cache when a store occurs. The article by Chen et al. applies this cache technique also to registers in the processor. Upon encountering a forward load instruction, the processor prefetches data from memory into a register. The load address used by the forward load instruction is saved after it has been used to load data. Subsequently, when a store instruction is executed, the store address of the store instruction is compared with the addresses used to prefetch data into each register. If the load and store addresses address the same data, the prefetched data in the relevant register is replaced by the store data that is stored by the store instruction.

The data is replaced from the time that the store instruction is completed. Thus, a register loaded with a forward load instruction always contains data that corresponds to the data that is actually in memory at the load address, no matter when the forward load instruction is executed. At the original location of the load instruction a "commit" instruction is added to prevent store instructions after that location from causing a substitution with store data. As a result the forward load instruction can be moved freely through the program, past any store instructions, without affecting the result of the program.

The technique described by Chen requires considerable overhead: for each forwarded load instruction an additional commit instruction is used, and it is necessary to provide an associative memory function that can use the store address to find the register or registers that have to be updated as a result of a store instruction.

SUMMARY OF THE INVENTION

Amongst others, it is an object of the invention to provide a data processor device in which advantages of moving a load instruction past a preceding store instruction can be realized with a less complex solution.

According to the invention, compensation of the effect of out of order execution of memory access instructions is incorporated in pipelined execution of the memory access instruction. Hence, the memory address needs to be compared only with one or more memory addresses present in one or more of the stages downstream in the pipeline, and not with memory addresses for all available registers. At a pipeline stage that makes irreversible changes to memory or register content, such change are suppressed or data obtained from a different stage is substituted if the memory addresses the same memory location, so as to obtain the same effect as if the memory access instructions had been executed in the original order.

For example, substitution of load data is incorporated in pipelined execution of a forward load instruction before a store instruction that may affect a memory location from which the load instruction loads data. At the end of pipelined execution of the forward load, the loaded data or, if appropriate due to a store and load address match, the stored data is written back into the result register of the forward load instruction.

In another example, suppression or substitution of store data is incorporated in pipelined execution of a first store instruction executed after a forwarded store instruction that may affect a memory location from which the first store instruction stores data. At pipeline stage where the first store instruction stores data, the data of the first store instruction, if appropriate due to an address match, no data or substituted data is written to memory.

An embodiment of the data processor device according to the invention includes an instruction, which indicates for which pipeline stages relative to the pipeline stage that executes the instruction the effect of out of order execution is to be compensated. The instruction that would execute incorrectly due to out of order execution or the other instruction that causes this incorrect execution or both may be used to indicate that compensation is necessary for a certain pipeline distance. This makes it possible to process either a load/store instruction that involve forward loading/storing or a load/store instruction that does not involve such forward loading/storing alternatively at the same point in the pipeline. Thus, a compiler place either a memory access instruction that has been moved out of order, or a memory access instruction that has not been so moved at the same place in the program and the compiler can select the appropriate type for each such memory access instruction to indicate whether it is necessary to provide for correction of the effect of movement with respect to indicated other memory instruction at selected distances relative to the memory access instruction.

These and other advantageous aspect of the invention will be described in a non-limitative way by reference to the following figures.

BRIEF DESCRIPTION OF THE DRAWINGS

FIG. 1 shows a data processing architecture. The architecture contains an instruction issue unit 10, a number of functional units 12a–c, a register file 14 and a memory 16. By way of example the architecture of a VLIW (Very Large Instruction Word) processor is shown, in which the instruction issue unit is capable of issuing a number of instructions in parallel to different functional units 12a–c. Although three functional units 12a–c are shown more or fewer functional units may be present without deviating from the invention. Different types of functional units, such as ALU's (Arithmetic Logic Units), branch control units, shift units, vector processing units, DSP's (Digital Signal Processor units etc. may be provided. One of the functional units 12a in FIG. 1 is shown as a memory access control unit 12a, coupled to the memory 16.

The instruction issue unit 10 has outputs coupled to the functional units 12a–c and read ports of the register file 14. The functional units 12a–c have inputs and outputs coupled to read ports and write ports respectively of the register file 14.

Figure 1:
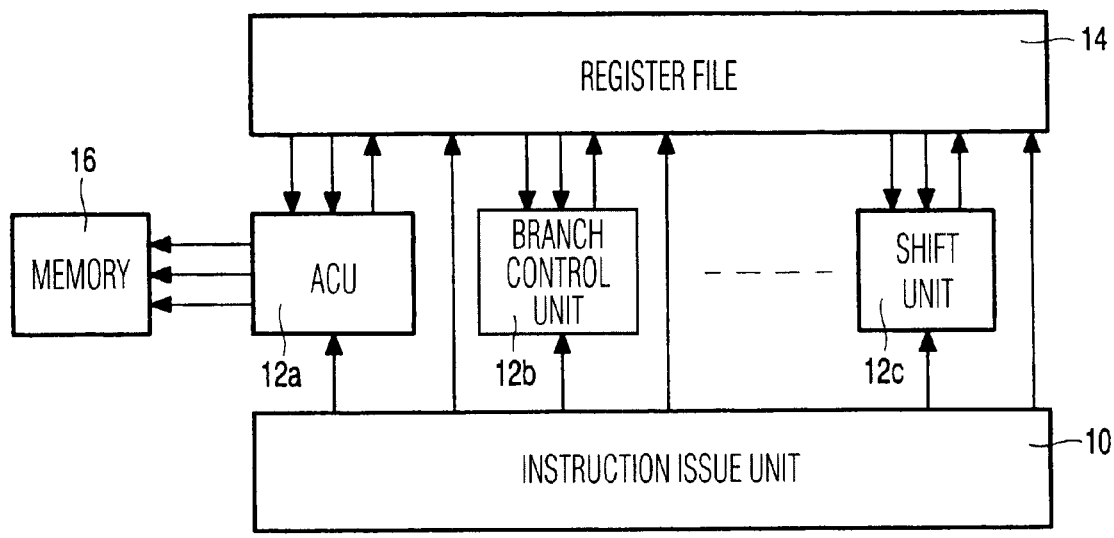
FIG. 1 shows a data processing architecture

In operation the processing architecture of FIG. 1 operates in successive instruction cycles. In each instruction cycle, the instruction issue unit 10 issues one or more instructions in parallel to the functional units 12a–c. For this purpose, the instruction issue unit 10 operates in a conventional way using an instruction memory (not shown) a program counter (not shown) etc.

Each instruction indicates an operation code, a number of registers in the register file 14 and optionally some literal data. The indication of registers serves to identify registers that contain source operands of the instruction and a result register where the result of the instruction must be stored. The instruction issue unit 10 uses the indication of registers that contain source operands to address read ports of the register file. The instruction issue unit 10 supplies the operation code, the indication of the result register and optionally the literal data to the functional unit 12a–c for which that particular instruction is intended.

DETAILED DESCRIPTION OF THE EMBODIMENT

The functional unit 12a–c uses data from the read ports of the register file 14, the operation code and optionally the literal data to process the instruction. If necessary, the functional unit 12a–c writes back a result to a write port of the register file 14.

The memory access control unit 12a operates as one of the functional units. As shown in FIG. 1, there is only one memory access control unit 12a that accesses memory 16, but more than one such memory access control unit may be present among the functional units 12a–c. The memory access control unit 12a receives an operation code, which indicates whether a load or a store instruction should be executed, how the memory address should be calculated and what data length should loaded or stored. The memory access control unit 12a uses this information to supply an address to the memory 16, together with a read/write control signal and any other control signal as appropriate. Write data is also supplied to memory 16 in case of a store instruction.

The memory access control unit 12a reads from memory or writes data to memory, dependent on whether a store or load instruction is executed. Write data is usually derived from operand data received from a read port of the register file 14. Read data is usually written to a write port of the register file 14.

Conventionally, the sequence in which store and load instructions are executed cannot be changed without running the risk of affecting the outcome of program execution. This is because storing data to memory may affect the result of subsequent load instructions if these instructions load from the same location where the store instruction stores data. Also, the sequence in which two store instructions are executed may affect the content of memory after the two store instructions if these store instructions address the same memory location.

The invention has the object to make it possible to change the sequence of executing load and store instructions without affecting the result of the program by this changing and/or to change the sequence of executing several load instructions without affecting the result of the program.

The invention will be described hereinafter using the change in sequence of executing load and store instructions as a primary example, but it is to be understood that the invention also concerns changing the sequence of executing different store instructions or different load instructions.

Figure 2:
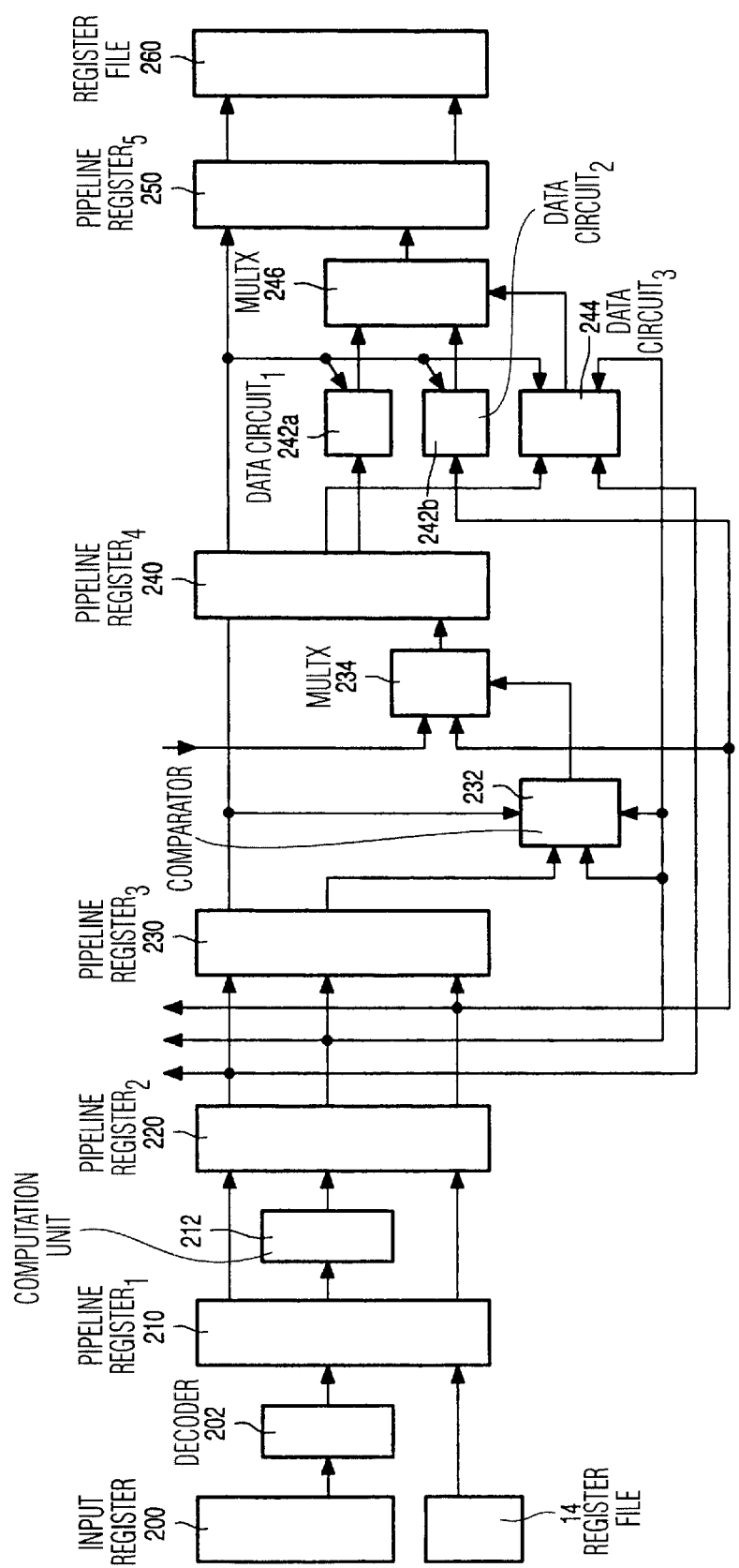
FIG. 2 shows a pipeline structure

FIG. 2 shows a pipeline structure of a memory access control unit 12a, emphasizing only those parts that are used to forward data from store instructions. In addition to the memory access control unit 12a FIG. 2 shows, at the beginning of the pipeline, an input register 200 that is the interface to the instruction issue unit 10. At the end of the pipeline, the register file 260 is shown (indicated at this position with a different reference number for the sake of clarity).

In the pipeline, a number of pipeline registers 210, 220, 230, 240 are shown, which mark the separations between different stages of the pipeline. In the pipeline, an instruction decoder 202 is provided between the input register 200 and a first stage pipeline register 210. The first stage pipeline register 210 has inputs coupled to an output of the instruction decoder 202 and the output of one or more read ports of the register file 14.

A second stage pipeline register 220 is coupled to the first stage pipeline register 210, partly via an address computation unit 212. The second stage pipeline register 220 has an address output, a data output and a control output coupled to a memory interface port.

A third stage pipeline register 230 has inputs coupled to the outputs of the second stage pipeline register 220. A number of further pipeline registers (not shown) may be present in between the second stage pipeline register 220 and the third stage pipeline register 230.

A fourth stage pipeline register 240 follows the third stage pipeline register 230. The third stage pipeline register 230 has outputs coupled directly to the fourth stage pipeline register 240 and to an input of a first comparator 232. The first comparator 232 has a further input coupled to the address output of the second stage pipeline register 220. The first comparator has an output coupled to a control input of a first multiplexer 234. The first multiplexer has inputs coupled to a data output of the memory (not shown) and to the data output of the second stage pipeline register 220. An output of the first multiplexer 234 is coupled to the fourth stage pipeline register 240.

A fifth stage pipeline register 250 follows the fourth stage pipeline register 240. The fourth stage pipeline register 240 has outputs coupled directly to the fifth stage pipeline register 250 and to a first input a second comparator 244. A second input of the second comparator 244 is coupled to the address output of the second stage pipeline register 220. An output of the second comparator 244 is coupled to a control input of a second multiplexer 246. A data output of the fourth stage pipeline register 240 is coupled to a first data input of the multiplexer 246 via a first data handling circuit 242a. A data output of the second stage pipeline register 220 is coupled to a second data input of the multiplexer 246 via a second data handling circuit 242b. The second multiplexer 246 has an output coupled to the fifth stage pipeline register 250.

The fifth stage pipeline register 250 has outputs coupled to a write port of the register file 260.

In operation the pipeline shown in FIG. 2 processes memory access instructions, such as store, normal load and forward load. An instruction is processed in steps. Each step is processed in a different stage of the pipeline in a different instruction cycle. Different steps of different instructions can be processed in parallel. In the instruction cycle in which a stage of the pipeline processes one step for a first instruction, a preceding stage may process another step for a subsequent instruction. In the one instruction cycle each stage may be processing a step for a different instruction.

In case of a normal load instruction the pipeline performs the following steps:

in a first step the decoder 202 decodes the instruction and generates a signal to indicate the result register; operand data is supplied from a read port or read ports of the register file in a second step a memory address is computed from the operands and possible further data such as an offset included in the load instruction, or the content of index registers in the memory access control unit 12a in a third step the memory address is supplied to the memory, with a read control signal in a fourth step, data is received from memory. The fourth step may be executed in the instruction cycle directly following the instruction cycle in which the third step is executed, but the fourth step may also be executed one or more instruction cycles later in case the memory is too slow to provide data sooner.

in a fifth step, the data required by the load instruction is obtained by handling the data received from memory in a sixth step the extracted data is written into the register file 14 in the result register indicated by the load instruction (in this step data may also bypass the register file 14 and go directly to a functional unit that addresses the result register).

In case of a store instruction, the first and second steps are substantially the same (except that there need be no indication of a result register). In the third step of processing the store instruction operand data is supplied to the memory together with the address and a write control signal. Normally, this terminates processing of the store instruction as far as the pipeline is concerned.

Execution of the forward load instruction follows the same steps as the normal load instruction, but with some differences. The function of these differences is to replace data loaded from memory by data stored to memory by a subsequent store instruction in case that subsequent store instruction addresses the same memory location as the forward load instruction.

To realize this function the load address used by the forward load instruction is passed along the pipeline from one stage register 220, 230, 240 to another 230, 240. In a number of stages this load address is compared with the store address of a store instruction that is processed by an earlier stage. Roughly speaking, if the load and store address match, the store data of that store instruction is substituted for the load data loaded from memory when the result of the forward load instruction is written back to the register file 14 at the end of the pipeline.

More in detail, the load address from the third stage pipeline register 230 is compared to the store address from the second stage pipeline register 220 in the first comparator. If the second stage pipeline register 220 indicates that it processes a store instruction and the third stage pipeline register 230 indicates that it processes a forward store instruction, and the store address and the load address match, then the first comparator 232 generates a signal to the first multiplexer to pass the store data from the second stage pipeline register 220 instead of the data received from memory.

Similarly, the load address from the fourth stage pipeline register 240 is compared to the store address from the second stage pipeline register 220 in the second comparator. If the second stage pipeline register 220 indicates that it processes a store instruction and the fourth stage pipeline register 240 indicates that it processes a forward store instruction, and the store address and the load address match, then the second comparator 244 generates a signal to the second multiplexer to pass store data from the second stage pipeline register 220 after handling by second handling circuit 242b instead of the data received from memory via the fourth stage pipeline register 240 and first handling circuit 242a.

Dependent on the word length of the forward load and store instructions various manipulations may be necessary. For example, if the store instruction stores at only part of the memory locations that are loaded by the forward load, then only part of the loaded data needs to be substituted.

In this respect it should be noted that the match detected by the comparators 232, 244 should, in this case, determine not so much whether the addresses are precisely equal, but rather whether the forward load instruction and the store instruction address a same memory location. This may differ from testing for address equality if a sequence of more than one memory location is addressed with one address. Such a test can be readily realized when a length code is passed along the pipeline and to the comparators with the address to indicate the data length of the load and store operations. This comparison can be further simplified by restricting forward loads to full words at word boundaries.

Figure 3:
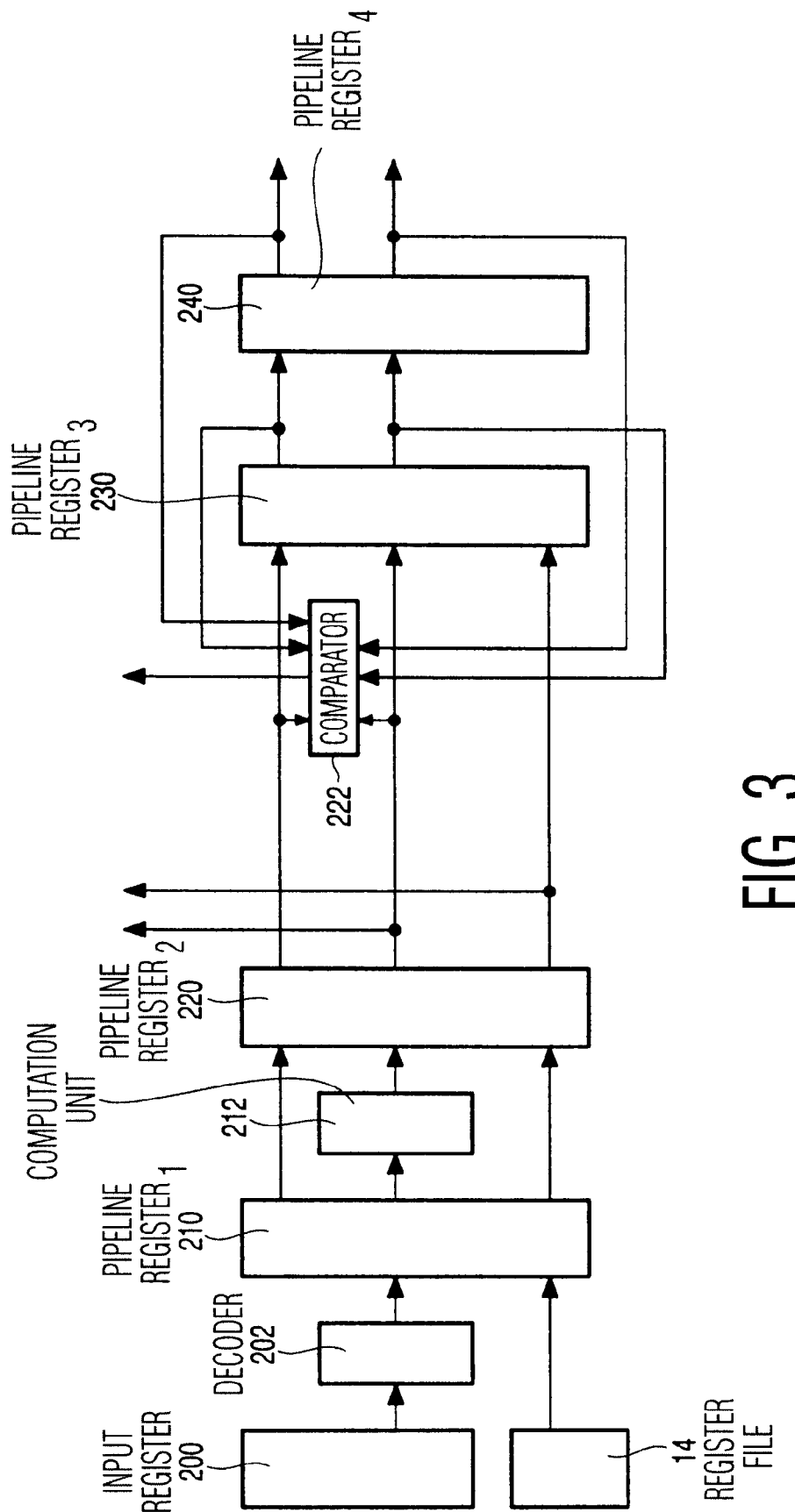
FIG. 3 shows a pipeline structure

FIG. 3 shows a similar pipeline as FIG. 2, but in this case showing those connections that allow a different sequence of execution of store instructions. In FIG. 3 store data from a later stage of the pipeline is substituted for store data from an earlier stage when data is applied to the memory from that earlier stage. This in contrast to FIG. 2, where store data was substituted for load data from memory at the later stage.

The input stage 200, the first pipeline stage 210 register and the second pipeline stage register 220 are connected in the same way as in FIG. 2. These registers are followed by the third and fourth stage pipeline register 230, 240, which have inputs for receiving addresses from further upstream in the pipeline. The address output of the second stage pipeline register 220 is coupled directly to the memory (not shown) and to a first input of a three way address comparator 222. A second and third input of the comparator are coupled to address outputs of the third and fourth stage pipeline register 230, 240 respectively. The address comparator furthermore has control inputs coupled to the second, third and fourth stage pipeline register 220, 230, 240. The address comparator 222 has an output coupled to a control input of the memory.

In operation, when the second stage pipeline register contains a first store instruction, the address and data of that store instruction are normally passed to memory and a "write" control signal is sent to memory. However, if one or more of the subsequent pipeline stage registers 230, 240 contain further store instructions (which have already been submitted to the memory) and the address used in at least one of those further store instruction matches that used in the first store instruction, the comparator 222 gives off a control signal that disables writing to memory. Thus the data stored by one of the further store instructions is not overwritten by the first store instruction.

The pipeline shown in FIG. 3 does not do this for any store instruction. Write is disabled only if the need to prevent write is indicated by one of the store instructions involved, for example by the first store instruction in the second stage pipeline register.

In a more complicated embodiment, the pipeline accounts for store access to overlapping but not identical memory locations. This occurs if different word lengths can be used in different store instructions, or if store instructions need not address memory at addresses that are a multiple of the word length. In one embodiment the store instruction is only partially disabled (for the overlapped memory locations). In another embodiment data from a later pipeline stage is substituted in the second pipeline stage and the write goes ahead.

Figure 3A:
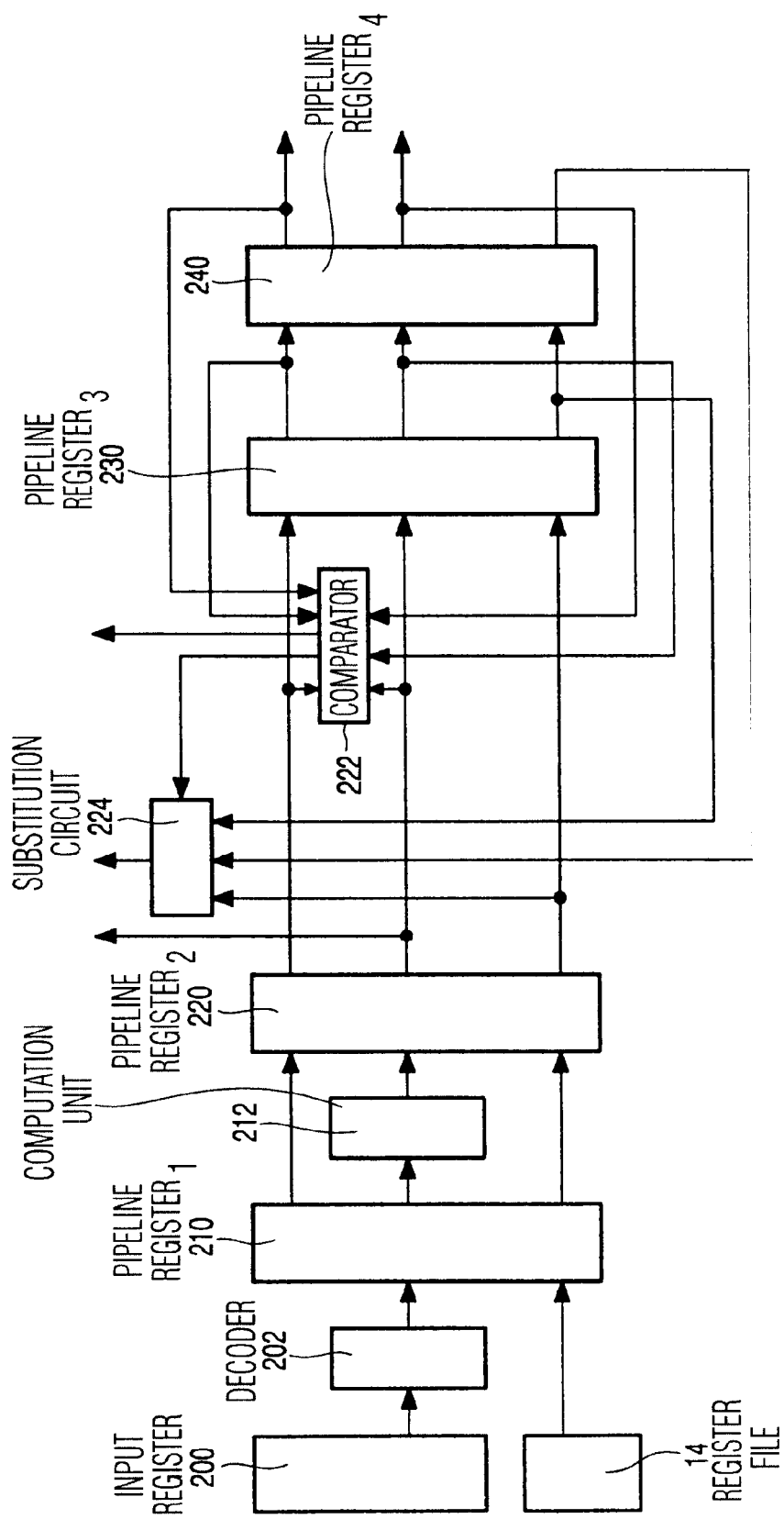
FIG. 3A shows a pipeline structure

This embodiment is shown in FIG. 3A. The embodiment is similar to the embodiment of FIG. 3, but a substitution circuit 224 has been added. In operation data that is written to memory at the second stage 220 is passed with the address along the pipeline to the subsequent pipeline stages 230, 240. This data is supplied back from the subsequent pipeline stages 230, 240 to the second stage 220. In case the comparator 222 signals a partial address match, the substitution circuit substitutes the data from the subsequent pipeline stage 230, 240 that has a matching address for data from the second pipeline stage 220, for those memory locations that are accessed by both store instructions. The data for other memory locations is taken from the second stage 220. The data from the second pipeline stage with substitutions from the subsequent pipeline stage is then written to memory.

So for example if the second pipeline stage writes a 32 bit word and a subsequent pipeline stage contains a store instruction for writing an 8 bit byte, then the part of the 32 bit word that is to be stored in this byte is replaced by data from the subsequent pipeline stage.

Of course, the invention is not limited to the specific embodiment of the pipeline shown in FIGS. 2, 3 and 3A. For example, if one wants to be able to substitute data from store operations that follow the load operation sooner, one might include additional comparators in one or more stages (not shown) before the stage that actually receives the corresponding load data addressed by the memory.

When such an additional comparator indicates a combination of a forward load in that stage and a store in the second stage 220 and matching load and store addresses, a flag may be set and passed along the pipeline, together with the store data of the store instruction whose address matches. After the third stage pipeline register 230, one should then select one of the data loaded from memory or the data thus passed through the pipeline dependent on the flag that is passed along the pipeline may be used to signal substitution by the data passed along the pipeline. The result of this selection or the data of the store instruction then in the second stage pipeline register 220, dependent on the output of the first comparator 232 is the passed to the next pipeline stage.

Instead of comparing the addresses in the instruction cycle in which the store address is generated at the second stage pipeline register 220, the store addresses may be passed along the pipeline for comparison at a later pipeline stage.

If processing speed allows, a multiplexer and possibly even a comparator may be inserted between the fifth stage pipeline register 250 and the write port of the register file 260. Thus, store instructions that follow the forward load at a greater distance can be accounted for. The last pipeline stage 242, 250 may even be deleted for straightforward word load instructions.

Figure 4:
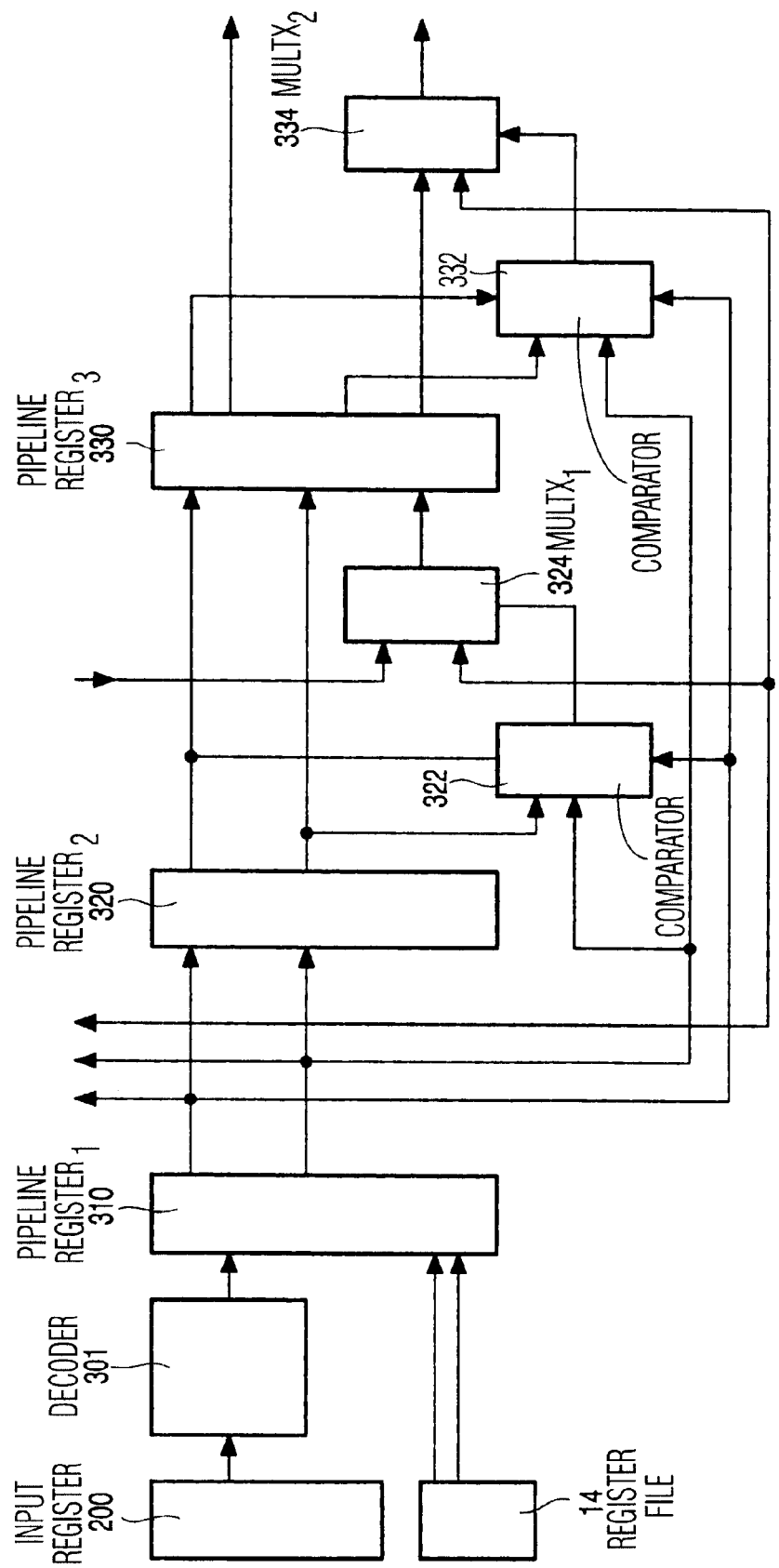
FIG. 4 shows a pipeline structure

FIG. 4 shows a further pipeline for a memory access unit. In comparison with the pipeline of FIG. 2, this pipeline has been simplified and speeded up. The pipeline of FIG. 4 has three pipeline registers 310, 320, 330.

A first stage pipeline register 310 receives instruction information via a decoder 301 and operand data from the register file 14. The first stage pipeline register 310 outputs control, address and (if necessary) data to the memory interface.

A second stage pipeline register 320 receives instruction information and address data from the first stage pipeline register 310. The second stage pipeline register 320 outputs address data and control information to a first comparator 322 which also receives address data and control information from the first stage pipeline register 310. An output of the first comparator is coupled to a control input of a first multiplexer 324, which has inputs coupled to a memory data output and to the data output of the first stage pipeline register 310.

A third stage pipeline register 330 receives instruction information and address data from the second stage pipeline register and data from the first multiplexer 324. The third stage pipeline register 330 outputs address data and instruction information to a second comparator 332, which also receives address a data and control information from the first stage pipeline register 310. The output of comparator 332 is coupled to a control input of a second multiplexer 334. The second multiplexer 334 has inputs coupled to a data output of the third stage pipeline register 330 and to a data output of the first stage pipeline register 310. An output of the second multiplexer 334 is coupled to a write port of the register file (not shown).

Basically, the memory access control unit of FIG. 4 corresponds to the memory access control unit of FIG. 2, with the deletion of a number of functions, such as the address computation stage (210, 212): instead addresses are taken directly from operands. Also the data extraction stage (242, 250) is deleted: only full words are used.

In operation, the memory access control unit of FIG. 4 works similar to the memory access control unit of FIG. 2, but faster and with less functionality. The memory access control units of FIGS. 2 and 3 represent illustrations of possible variations in the design of the pipeline. Of course any combination of such variations can be used. Which combination is to be preferred depends on considerations such as whether pipeline steps can be executed sufficiently quickly and hardware cost.

The advantage of using forward load instructions for program execution can be illustrated with the following example. Suppose a program has to have the effect of the following sequence of instructions:

ST;LD;A;

The A instruction uses the result register of the LD instruction. It is possible, but not certain, that the ST instruction stores data at the location where the LD instruction loads data. With normal load and store instructions, the pipeline of FIG. 2 would require that the program performing this sequence looks something like

ST;LD;X1;X2;X3;X4;X5;A;

Other instructions X1–X5 have to be added to ensure that instruction A executes the data only after the LD has been effected.

It is questionable whether a sufficient number of such other instructions is available without violating the data dependencies required by the program (these instructions should not use the result of A, and they should not produce results that are needed by the load or store instruction). If there is not a sufficient number, the processor will have to idle, which leads to an increase in execution time. This is all the more difficult in case of a processor that can issue more than one instruction in parallel, such as a VLIW processor, because even more instructions are needed to make use of the space between the LD instruction and instruction A.

Moving the LD instruction in front of the ST instruction would reduce this problem.

FLD;X1;X2;ST;X3;X4;A;

Now, the space between the load instruction (FLD) can be filled with the store instruction and with instructions X1, X2 that produce results needed by the store instruction. But this is only possible with a forward load instruction FLD because the result of the load instruction may depend on the store instruction.

Simulations with benchmark programs have shown that the ability move the load instruction before the store instruction typically allows a 6–7% decrease in execution time. Note that this gain is primarily due to the possibility to put the store instruction in the pipeline delay of the forward store instruction. Making it possible to move the forward load even further ahead of the store instruction (for example by including a cache coherence-like mechanism which treats the registers as a memory cache) usually will not provide much further performance gain, for lack of instructions X for filling the additional distance between the load and the store instruction.

Preferably, the processor provides for an even more refined control over whether new data stored by the store instruction is loaded by the load instruction or whether "old" data from memory is loaded by the load instruction. For example, it may be desirable to provide for an instruction sequence like

FLD;X1;X2;ST1;ST2;X4;A;

Where the result of a first store instruction ST1 is forwarded to the forward load instruction FLD, but not the result of ST2, even though the store address of ST2 is available while the forward load instruction is still in the pipeline and hardware is available in the pipeline to forward the store data for the forward load instruction.

Such selective forwarding makes it possible to schedule store instructions that should not affect the load FLD, like ST2, in an earlier instruction cycle. In this way the instruction cycles can be used more efficiently, and instructions that depend on the store instruction ST2 can be scheduled sooner.

Preferably, the selective forwarding is realized by providing different versions of the load and/or store instructions. Each version defines one or more relative positions of the store and load in the pipeline. Only for instructions at those relative positions will forwarding of data from the store to the load be effected. Different versions define different sets of relative positions.

For example, there may be two versions of the forward load instruction. One version loads data forwarded from store instructions that start execution at N and N+1 instruction cycles after the forward load instruction. Another version loads data forwarded from a store instruction that start N instruction cycles after the forward load instruction, but not from a store instruction that starts N+1 instruction cycles after the forward load instruction.

Alternatively, there may be different versions of the store instruction. One version forwards data to forward load instructions that start execution at N and N+1 instruction cycles before this store instruction. Another version forwards to a forward load instruction that start N instruction cycles before this store instruction, but not to a forward load instruction that starts N+1 instruction cycles before this store instruction.

In a further alternative, both store and load instructions can indicate whether forwarding should be used, forwarding taking place only when both instructions so indicate (or, in an alternative embodiment, when at least one so indicates). This provides for an even more refined control of forwarding, which is useful if more than one load and/or store instruction can start execution in the same instruction cycle, for example in a VLIW processor. The processor can implement such instructions by passing a code that identifies the version of the load or store instruction along the pipeline. This code is supplied as control information to the comparators. Each comparator controls substitution from a store to a load for a specific relative position of this store and load in the pipeline. The comparator is arranged to signal a need to substitute forwarded data only if the load and store address match and the code derived from the load and/or store instruction at the relevant stage of the pipeline indicates that the version of the load and/or store requires such a substitution.

In the case of programs with several store operations, it is also possible to gain speed by moving store instructions past each other. For example, suppose a program has to perform two data producing instructions A1, A2 and two store instructions ST1, ST2 in the sequence

A1;A2;ST2;ST1;

Here A1 produces data used by ST1 and A2 produces data used by ST1. Furthermore suppose that it is possible that ST1 can overwrite a memory location written by ST2. In a VLIW processor, executing ST1 sooner can reduce the number of instruction cycles used to execute these instructions:

A1;(A2+FST1);ST2

(Here A2 and FST1 start execution in the same instruction cycle). However, this is only possible if it is ensured that ST2 does not overwrite data written by FST1. This can be realized by using a pipeline as shown in FIG. 3. The store instruction FST1 indicates that the following store instruction ST2 must be disabled in case of an address match.

It has been found that for some benchmark programs this allows a reduction in execution time of up to 7%. However, the reduction is frequently less than that attainable by moving load instructions past store instructions. Depending considerations of hardware cost and the applications for which the processor is intended it may therefore be preferable to include only provisions for forward load instructions and not for forward store instructions.

One may use different versions of store instructions to indicate whether or not a store should be disabled when two store instructions are at a given position relative to one another in the pipeline. Similar to the case of load/store combinations, this can be indicated by the first executed store instruction FST1 or by the second executed store instruction ST2 or by a combination of both. Thus, in a sequence ST1;ST2;ST3
ST3 might indicate that its writing should be disabled in case there is an address match with ST1 but not in case of an address match with ST2.

Figure 5:
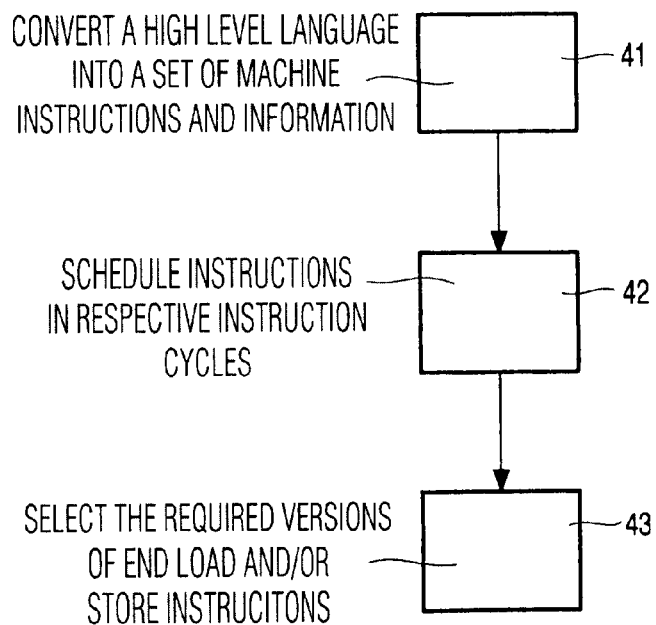
FIG. 5 shows a flow chart for generating a program of machine instructions.

FIG. 5 shows a flowchart for generating a scheduled set of machine instructions for a processor with forward stores. A compiler or scheduler (herein both generally referred to as scheduler) typically selects the sequence of execution of instructions.

In a first step 41 a program in a high level language is converted into a set of machine instructions and information (such as instruction sequence) that represents a data dependency graph, which indicates data dependence relations between pairs of instructions (data user-producer relations between instructions).

In a second step 42, the instructions are scheduled in respective instruction cycles. In a VLIW machine, each instruction cycle may even have more than one scheduled instruction. In this second step it must be ensured that dependent instructions will not be executed before data is available from instructions on which they depend. In a VLIW machine not more instructions may be scheduled together than the hardware can execute. Otherwise there is freedom in choosing the sequence in which the instructions are scheduled. This freedom is used to search for an assignment of instructions to instruction cycles that minimize the number of instruction cycles that is needed to execute the program for typical input data.

When a processor according to the invention is used the scheduler can schedule a load instruction in an instruction cycle after the store instruction cycle containing the store instruction that may affect the load data, but also in an earlier instruction cycle before such a store instruction cycle, if this earlier instruction cycle is not more than a pipeline delay before this store instruction cycle. Of course, if the load store combination is not ambiguous, i.e. when it is known from the program that they cannot address the same memory location, then the load instruction can be moved even further ahead.

At least for each load instruction that is scheduled within a pipeline delay before and a store instruction, the second step 32 keeps information indicating whether the load instruction depends on the store instruction (e.g. corresponds to a statement in the original program after the store instruction) or not.

In a third step 43, once the scheduler has decided the relative scheduling of load and store instructions, it subsequently selects the required version of each load and/or store instructions (e.g. forward load in general, or forward load from store instructions N cycles later) dependent on the required dependency indicated by the second step 32 and the relative position where the load and store instructions are scheduled.

What is claimed is:

1. A data processing device having an instruction set with memory access instructions, the device comprising a circuit for correcting an effect of executing the memory access instructions out of order with respect to one another, the device comprising a pipeline for instruction execution, the device comprising:
    a detector for detecting whether a same memory location is addressed by a first and second memory address used to access memory for a first and second memory access instruction that are processing at a predetermined relative distance in the pipeline respectively;
    a correction circuit for modifying data handling in a pipeline stage processing the first memory access instruction when the detector signals said addressing of the same memory location and for causing the first and/or second memory access instruction programs a command to compensate said effect of out of order execution of the first memory access instruction with respect to said second memory access instruction.

2. A data processing device according to claim 1, the instruction set comprising a class of memory access instructions for the same type of access operation, different instructions of the class commanding compensation of said effect for different sets of one or more relative distances.

3. A data processing device according to claim 1, the first and second memory access instruction being a memory load and a memory store instruction respectively, the correction circuit substituting data written to memory by the memory store instruction for data read from memory by the memory load instruction when the memory store instruction is processed in a further pipeline stage upstream from said pipeline stage that processes the memory load access instruction.

4. A data processing device according to claim 1, the first and second memory access instruction both being memory store instructions, the correction circuit preventing a write to memory by the first instruction when the second instruction is processed in a further pipeline stage downstream from the pipeline stage that processes the first instruction.

5. A data processing device according to claim 1, the first and second memory access instruction both being memory store instructions, the correction circuit substituting data written by the second instruction into data that is to be written to memory by the first memory access instruction when the second instruction is processed in a further pipeline stage downstream from the pipeline stage that processes the first instruction.

6. A method of executing a program in a data processing device, the method comprising
    pipeline execution of instructions from the program in an instruction execution pipeline;
    detection whether a first and second memory access instruction in a first and a second predetermined stage of the pipeline address a same memory location;
    modifying data handling by the first memory access instruction in the pipeline if said addressing the same memory location is detected by causing the first and/or second memory access instruction programs a command to compensate an effect of out of order execution of the first memory access instruction with respect to said second memory access instruction.

7. A method according to claim 6, the instruction set comprising a class of memory access instructions for the same type of access operation, different instructions of the class commanding compensation of said effect for different sets of relative distances between the first and second predetermined stage.

8. A method according to claim 6, the first and second memory access instruction being a memory load and a memory store instruction respectively, the first stage of the pipeline being downstream from the second stage of the pipeline, said modifying comprising substituting data written to memory by the memory store instruction for data read from memory by the memory load instruction.

9. A method according to claim 6, the first and second memory access instruction both being memory store instructions, the first stage of the pipeline being upstream from the second stage of the pipeline, the modifying comprising preventing a write to memory by the first instruction.

10. A method according to claim 6, the first and second memory access instruction both being memory store instructions, the first stage of the pipeline being upstream from the second stage of the pipeline, the modifying comprising substituting data written by the second instruction into data that is to be written to memory by the first memory access instruction.

11. A method of compiling a program for a pipelined processor, wherein the processor has an instruction set with a normal version and an out of order version of a first memory access instruction, the out of order version commanding modified execution of the first memory access instruction or a second memory access instruction, so as to compensate an effect of out of order execution of the first and second memory access instruction, in case the first and second memory access instruction are at a predetermined position relative to one another in the pipeline and address a same memory location, the method comprising receiving a program with memory access instructions and information specifying an order of execution of the memory access instructions;

scheduling an instruction execution sequence, wherein pairs of memory access instructions are scheduled out of order with respect to one another, at a distance of a number of instruction cycles that is smaller than a length of the pipeline;

selecting a version among the versions of the memory access instructions, depending on whether the memory access instructions are part of such pairs.

12. A method according to claim 11, wherein the version is selected dependent on the distance.

* * * * *